July 17, 1962 R. W. BLANCHARD 3,045,191

TRANSISTOR PHASE SHIFT OSCILLATORS

Filed Sept. 2, 1958

Inventor
ROBERT W. BLANCHARD
By Charles Baraff
Agent

United States Patent Office 3,045,191

Patented July 17, 1962

3,045,191

TRANSISTOR PHASE SHIFT OSCILLATORS

Robert W. Blanchard, East Orange, N.J., assignor to International Telephone and Telegraph Corporation, Nutley, N.J., a corporation of Maryland Filed Sept. 2, 1958, Ser. No. 758,292
6 Claims. (Cl. 331—108)

This invention relates to transistor phase shift oscillators, and is an improvement over the transistor oscillator disclosed in the U.S. Patent application, Serial No. 633,066, filed January 8, 1957, by H. F. Herbig and E. R. Schmidt.

A phase shift oscillator as disclosed in the aforementioned Herbig-Schmidt application, Serial No. 633,066, is characterized by a common-emitter transistor stage and a phase shift feedback between the collector output and the base input of the transistor. To provide adequate gain and stability, a feedback bias resistor is connected from the transistor base element to a tap on the load resistor. The operating point of the transistor is determined by the relative values of the feedback resistor and a base-to-emitter resistor.

An object of the invention is to provide an improved operating characteristic in a transistor phase shift oscillator.

Another object of the invention is to extend the operating frequency range of a transistor phase shift oscillator and at the same time enable it to utilize marginal transistors.

A feature of the invention is a pair of parallel RC phase shifting networks in the feedback path of a transistor oscillator, one network providing a leading phase shift and the other a lagging phase shift.

In accordance with the invention, a supplemental RC phase shift network is provided in the D.C. feedback path of a phase shift transistor oscillator, thereby providing a pair of parallel phase shift paths. While the customary phase shift network leads in phase, the supplemental network provides a lagging phase shift. Due to the combination of parallel RC phase shift networks aforementioned, the transistor oscillator is improved in performance, provides a greater output, and has a lessened frequency dependence on the D.C. bias and an increased frequency range.

Referring to the figures of the drawing.

The disclosure of the aforementioned Herbig-Schmidt application, is incorporated herein to the extent of the subject matter common to both applications. Reference is made to this application for a detailed disclosure of the circuit shown in FIG. 1.

Figure 3A:
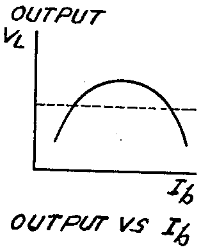
FIGS. 3A–3D are graphs showing the characteristics of the prior art oscillator.
Figure 3B:
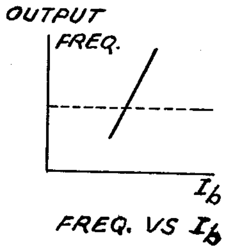
Figure 3C:
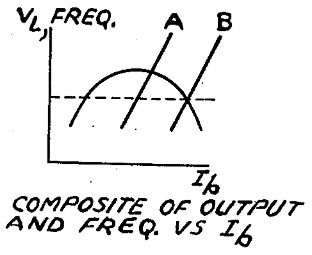

In a phase shift oscillator of the type disclosed in Herbig-Schmidt application aforementioned, certain limitations in operation may arise which the present invention overcomes. Some of the limitations encountered may be specified as:

(1) The output of the oscillator may vary with $Ib$, peaking at some value of $Ib$, the base current (FIG. 3A), (2) The oscillator frequency is set by adjustment of $Ib$; thus the maximum output and the desired oscillator frequency may happen to coincide (FIG. 3C, line A) or not (FIG. 3C, line B). For some transistors, the frequency line is shifted so far by input capacity that loop gain around the feedback loop is less than unity at the desired frequency and oscillation ceases, particularly for higher frequency oscillators.

Figure 3D:
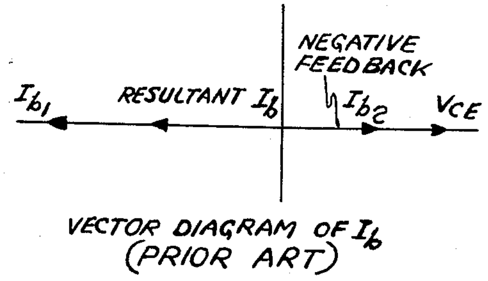

(3) The D.C. bias resistor RF passes a negative feedback current which is exactly out of phase with the desired feedback through the regular RC network and subtracts from it (FIG. 3D), reducing the oscillator output.

Figure 2:
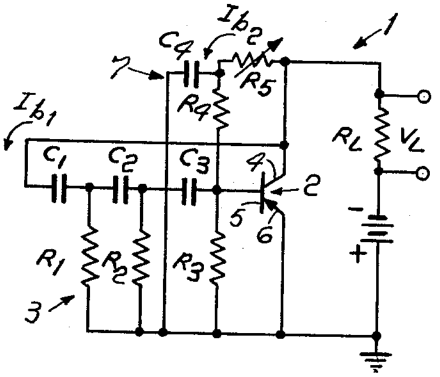
FIG. 2 shows a transistor phase shift oscillator in accordance with the present invention.

Referring to FIG. 2, the phase shift oscillator 1 comprises a junction transistor 2 with an RC network 3 comprising condensers C1, C2, C3 connected in series between the collector 4 and base terminal 5 of the transistor 2. The shunt resistors R1, R2, R3 of the RC network are connected respectively from the condenser-junction points to the transistor-emitter terminal 6. The feedback resistors R4, R5 and the load resistor RL correspond to RF and RL shown in the aforementioned Herbig-Schmidt application.

Figure 4A:
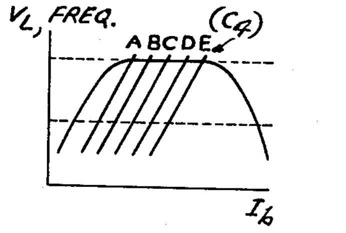
FIG. 4A is a graph showing the improved transistor characteristics provided by the present invention.
Figure 4B:
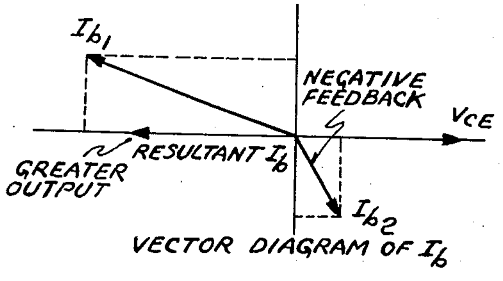
FIG. 4B is a vector diagram of the currents developed by the parallel phase shift networks in the feedback path of the oscillator and their resultant in accordance with the present invention.

The RC network 3 which is located in the feedback path of the oscillator 1 introduces a leading phase shift in the oscillator current $Ib_1$ as shown in FIG. 4B.

In accordance with the present invention, an additional RC network 7 is provided in the oscillator feedback path, and comprises essentially a condenser $C_4$ of small value which, in conjunction with feedback resistors R4, R5, introduces a lagging phase shift in the $Ib_2$ path shown in FIG. 2.

The resultant current $Ib$ derived from the leading and lagging phase shift currents $Ib_1$ and $Ib_2$ is shown in the vector diagram of FIG. 4B.

The increased resultant current $Ib$ of FIG. 4B provides a greater oscillator output and greatly reduces the frequency dependence of the transistor oscillator on the D.C. bias, as compared with the oscillator disclosed in the aforementioned Herbig-Schmidt application.

Other advantages of the present oscillator circuit (FIG. 2) are that the oscillator frequency being now dependent on the condenser C4 as well as the D.C. bias allows frequency adjustment of the oscillator to be independent of $Ib$. Also the frequency shift with changes of line voltage is greatly reduced over a wide range of voltages.

The D.C. negative feedback resistor composed of R4 and R5 is necessary to provide D.C. bias for the transistor 2 and also contributes to the stabilization of the bias and to the stability in general. However, it tends to reduce the A.C. output of the oscillator. The addition of condenser C4 serves to shift the phase of the A.C. negative feedback and thereby increases the output at the higher end of the frequency range.

FIG. 4A corresponds to FIG. 3C, but represents the improved characteristics achieved with the circuit in accordance with the invention. The output, instead of peaking at only one value of $I_2$ (FIG. 3B), stays at its maximum value over a wide range of $Ib$, the base current. Lines A, B, C, D, E show the effect on frequency of various values of condenser C4. Thus maximum output and the desired oscillator frequency can be obtained at the same time, and stability greatly improved as well.

Figure 1:
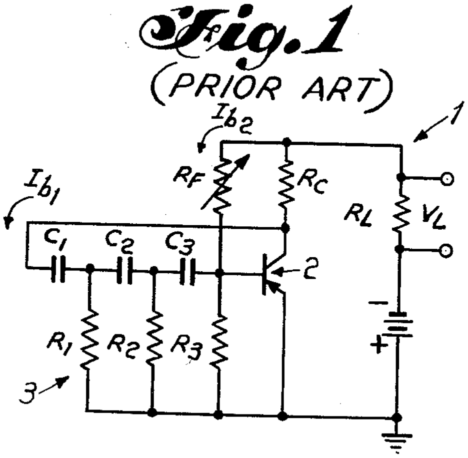
Fig. 1 (PRIOR ART)
FIG. 1 shows a prior art transistor phase shift oscillator.

In comparing FIG. 2 with the prior art circuit of FIG. 1, it should be noted that resistor RF (FIG. 1) has been split into feedback resistors R4 and R5 to make up the lagging phase shift network. $Rc$, the collector resistance of FIG. 1, has been omitted to increase A.C. feedback from collector to base of the transistor 2 and increase oscillator output by about 10%.

Although an embodiment of the invention has been illustrated and described in detail, it is to be expressly understood that the invention is not limited thereto. Various changes may also be made in the design and arrangement of the parts without departing from the spirit and scope of the invention as will now be understood by those skilled in the art. For a definition of the limits of the invention, reference will be had primarily to the appended claims.

While for the purpose of illustration and description of the present invention, certain specific embodiments have been shown in the drawing, it should be understood that this is not by way of limitation. Obviously, the invention is susceptible of other embodiments commensurate with the scope of the invention as defined in the appended claims.

I claim:

1. A transistor phase-shift oscillator comprising a transistor having emitter, base and collector electrodes, a load resistance connected between said collector and emitter electrodes, means for connecting a source of direct-current bias in series with said load resistance, a leading phase-shift network coupled between the collector-to-emitter output and base-to-emitter input of said transistor, a feedback path including a feedback resistor connecting said base electrode to a point of said load resistance which provides favorable stability and amplification, means for coupling useful output signals from a circuit between said collector and emitter electrodes, and a lagging phase shift network connected between said collector and emitter electrode.

2. A transisitor phase-shift oscillator as in claim 1, wherein said phase shift networks are connected in parallel.

3. The oscillator of claim 1, wherein bias resistors are connected between the collector and base electrodes of the transistor, and the lagging phase shifter network is an RC circuit having a small value condenser connected between the junction of the bias resistors and the emitter electrode of the transistor.

4. The oscillator of claim 3, wherein direct current feedback is provided between the collector and base electrodes, and said condenser provides a phase shifted alternating current feedback without changing the direct current feedback.

5. An oscillator comprising a transistor having emitter, base and collector electrodes, a leading phase-shift network coupled to said electrodes including a plurality of series connected capacitors and a plurality of shunt connected resistors, one terminal of the first of said capacitors being connected to said collector terminal, one terminal of the last of said capacitors and one terminal of the last of said resistors being connected to said base terminal, all but the last of said resistors having one terminal connected between successive capacitors, the remaining terminal of each of said resistors being connected to said emitter electrode, a load resistance having one terminal connected to said collector electrode, a feedback path connected between a point on said load resistance and said base terminal, and a lagging R–C phase shift network connected between said collector and emitter electrode.

6. The oscillator of claim 5, wherein said feedback comprises a direct current feedback circuit including two feedback resistors connected between said collector and base electrodes, one of said feedback resistors being adjustable, and said lagging phase shift network includes a condenser connected to said feedback resistors.

References Cited in the file of this patent

UNITED STATES PATENTS

| | | |
|---|---|---|
| 2,031,224 | Moullin | Feb. 18, 1936 |
| 2,382,198 | Bollinger | Aug. 14, 1945 |
| 2,451,858 | Mork | Oct. 19, 1948 |
| 2,662,183 | Bridges | Dec. 8, 1953 |
| 2,749,441 | Kelly | June 5, 1956 |
| 2,764,643 | Sulzer | Sept. 25, 1956 |